(12) United States Patent
Lynch et al.

(10) Patent No.: US 7,447,215 B2
(45) Date of Patent: Nov. 4, 2008

(54) METHODS, SYSTEMS, AND COMPUTER PROGRAM PRODUCTS FOR CLASSIFYING A PACKET BASED ON A DESTINATION ADDRESS

(75) Inventors: John Lynch, Raleigh, NC (US); Matt Squire, Raleigh, NC (US); Rich Williams, Chapel Hill, NC (US)

(73) Assignee: Hatteras Networks, Durham, NC (US)

( * ) Notice: Subject to any disclaimer, the term of this patent is extended or adjusted under 35 U.S.C. 154(b) by 1065 days.

(21) Appl. No.: 10/308,486

(22) Filed: Dec. 3, 2002

(65) Prior Publication Data

US 2003/0103507 A1    Jun. 5, 2003

Related U.S. Application Data

(60) Provisional application No. 60/336,763, filed on Dec. 3, 2001.

(51) Int. Cl.
*H04L 12/56* (2006.01)
*G06F 15/16* (2006.01)

(52) U.S. Cl. .................. 370/395.54; 370/469; 709/230

(58) Field of Classification Search ............ 370/395.54, 370/469; 709/230
See application file for complete search history.

(56) References Cited

U.S. PATENT DOCUMENTS

| | | | | |
|---|---|---|---|---|
| 6,006,272 A | * | 12/1999 | Aravamudan et al. | 709/245 |
| 6,061,739 A | * | 5/2000 | Reed et al. | 709/245 |
| 6,070,187 A | * | 5/2000 | Subramaniam et al. | 709/220 |
| 6,343,083 B1 | * | 1/2002 | Mendelson et al. | 370/466 |
| 6,393,484 B1 | * | 5/2002 | Massarani | 709/227 |
| 6,466,986 B1 | * | 10/2002 | Sawyer et al. | 709/245 |
| 6,701,361 B1 | * | 3/2004 | Meier | 709/224 |
| 6,907,470 B2 | * | 6/2005 | Sawada et al. | 709/244 |
| 6,931,003 B2 | * | 8/2005 | Anderson | 370/389 |
| 6,937,602 B2 | * | 8/2005 | Whitehill et al. | 370/395.54 |
| 7,031,314 B2 | * | 4/2006 | Craig et al. | 370/392 |
| 7,046,666 B1 | * | 5/2006 | Bollay et al. | 370/392 |
| 7,047,313 B1 | * | 5/2006 | Broerman | 709/238 |
| 7,072,335 B1 | * | 7/2006 | Kadambi et al. | 370/389 |
| 7,099,276 B1 | * | 8/2006 | Kalkunte et al. | 370/230.1 |
| 7,127,524 B1 | * | 10/2006 | Renda et al. | 709/245 |
| 7,174,376 B1 | * | 2/2007 | Daruwalla | 709/223 |
| 2002/0091975 A1 | * | 7/2002 | Redlich et al. | 714/699 |
| 2002/0138628 A1 | * | 9/2002 | Tingley et al. | 709/227 |

OTHER PUBLICATIONS

Braden et al. "Requirements for Internet Gateways," *ISI*, pp. 1-53 (Jun. 1987) www.ietf.org/rfc/rfc1009.txt?number=1009.
Carl-Mitchell et al. "Using ARP to Implement Transparent Subnet Gateways," *Texas Internet Consulting*, pp. 1-8 (Oct. 1987) www.ietf.org/rfc/rfc1027.txt?number=1027.

* cited by examiner

*Primary Examiner*—Alpus H Hsu
(74) *Attorney, Agent, or Firm*—Myers Bigel Sibley & Sajovec, P.A.

(57) ABSTRACT

A packet is classified by associating a network layer address with a service, obtaining the data link layer address for that network layer address, and associating a packet with that service if the data link layer destination address associated with the packet matches the data link layer address associated with the service.

21 Claims, 6 Drawing Sheets

METHODS, SYSTEMS, AND COMPUTER PROGRAM PRODUCTS FOR CLASSIFYING A PACKET BASED ON A DESTINATION ADDRESS

RELATED APPLICATIONS

This application claims the benefit of Provisional Application No. 60/336,763, filed Dec. 3, 2001, the disclosure of which is hereby incorporated herein by reference.

BACKGROUND OF THE INVENTION

The present invention relates to communication networks, and, more particularly, to associating packets with services in communication networks.

In general, communication service providers obtain revenue by providing services. It is desirable, therefore, for service providers to offer multiple services to a customer over a single physical access link. In many cases, some type of tag may be used to differentiate packets between the multitude of services.

Various techniques may be used to mark or tag packets to allow for service differentiation. The Internet Protocol (IP) defines several fields within a packet, which may be used to carry a class of service marking. The type of service (TOS) and diffserve codepoint (DSCP) fields, for example, may be used to differentiate various qualities of service groupings across the network. The IEEE 802.1Q specification defines Virtual LAN (VLAN) fields, which may be used to associate packets with a particular VLAN, i.e., a group of computers and other network resources that behave as if they were connected to a single network segment. Multi-protocol Label Switching (MPLS) also provides for placement of tags on packets to differentiate multiple traffic flows.

In the foregoing examples, a named field in a packet may be used to provide explicit service differentiation based on the packet contents. Customer equipment may be capable of including such markings or tags in the packets to allow for service classification and differentiation based on these markings and/or tags. Unfortunately, less sophisticated customer equipment may not be able to insert the markings and/or tags in the packets. For example, less sophisticated hubs and/or routers may be able to forward packets, but not mark and/or tag them.

SUMMARY OF THE INVENTION

According to some embodiments of the present invention, a packet is classified by associating a network layer address with a service, obtaining the data link layer address for that network layer address, and associating a packet with that service if the data link layer destination address associated with the packet matches the data link layer address associated with the service. A service provider, therefore, may identify packet traffic as being associated with a particular service implicitly based only on layer two communication protocol information carried by the packet. This may allow the service provider to differentiate between traffic associated with different services even if a customer has relatively unsophisticated networking equipment that is incapable of marking and/or tagging packets with a particular service identifier.

In particular embodiments, the network layer address is an Internet Protocol (IP) address and the data link layer addresses are Medium Access Control (MAC) addresses.

In further embodiments, the data link layer address is obtained by sending an Address Resolution Protocol (ARP) request for the data link layer address and receiving a Medium Access Control (MAC) address corresponding to the data link layer address in response.

In still further embodiments, the service comprises an Internet access service and associating the network layer address with the service comprises detecting a routing protocol executing on an Internet router that broadcasts the network layer address of the Internet router and associating the network layer address of the Internet router with the Internet Access service. Alternatively, a Dynamic Host Configuration Protocol (DHCP) packet that contains the network address of the Internet router may be snooped. The network layer address obtained from the DHCP packet may be associated with the Internet access service.

Non-IP packets may also be classified as being associated with a particular service in accordance with some embodiments of the present invention. For example, an ARP request packet for obtaining the data link layer address for a particular IP destination address is detected and associated with a particular service based on the IP destination address in the ARP request.

Packets may also be classified as being associated with one service or another based on layer three communication protocol information obtained for the packets in accordance with some embodiments of the present invention. For example, one or more IP subnet addresses used in a private network and an IP address of an Internet gateway device are determined. For IP packets, the destination IP address is compared against the IP subnet addresses for the private network. If the destination matches a subnet in that set, then the packet is classified as being associated with a private network service. Otherwise, the packet is classified as being associated with Internet service. In other embodiments, if the packet is not an IP packet and not an ARP packet, then the packet is classified as being associated with a non-Internet service (e.g., non-Internet traffic). If the packet is an ARP packet, then the network destination address requested in the ARP request is compared against that of the Internet gateway, and, if it matches, then the packet is classified as being associated with Internet service. Otherwise, the packet is classified as being associated with a non-Internet service.

Although described primarily above with respect to method aspects of classifying packets as being associated with one service or another based on layer two (data link layer) and/or layer three (network layer) communication protocol information obtained for the packets, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Embodiments of the present invention are described herein in the context of processing a packet. It will be understood that the term "packet" means a unit of information that may be transmitted electronically as a whole from one device to another. Accordingly, as used herein, the term "packet" may encompass such terms of art as "frame" or "message," which may also be used to refer to a unit of transmission.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

To provide multiple services to a customer over a single physical access link, a network service provider needs a way to associate traffic with the multiple services. More complex and costly customer networking equipment may mark and/or tag packets to associate the packets with specific services. Unfortunately, less sophisticated networking equipment may not be able to mark and/or tag packets to allow for such service differentiation.

Figure 1:
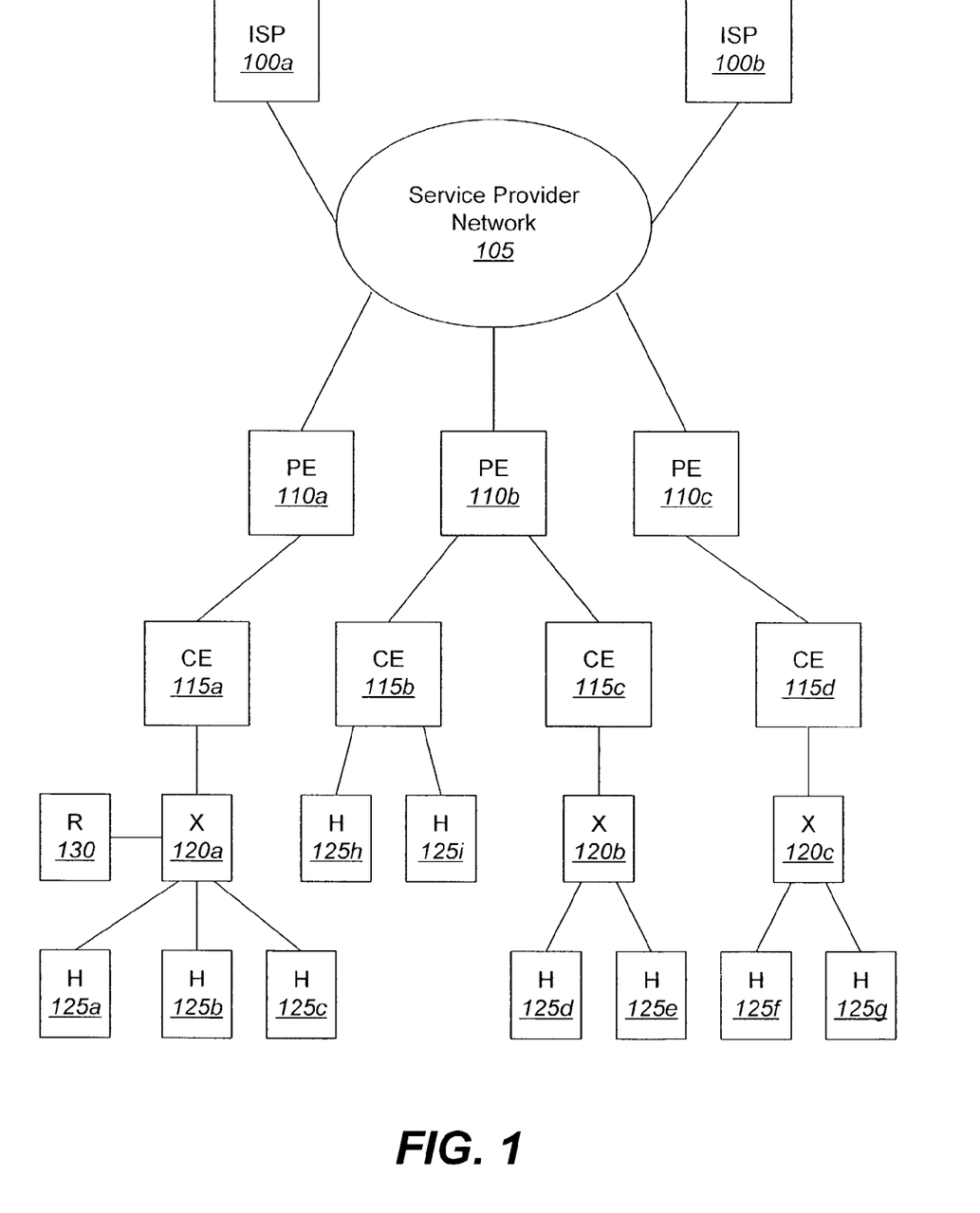
FIG. 1 is a block diagram that illustrates a communication network model in accordance with some embodiments of the present invention.

FIG. 1 illustrates an exemplary network, in accordance with some embodiments of the present invention, in which a single physical link is used to provide multiple services to a customer. As shown in FIG. 1, two Internet Service Providers (ISPs) 100a and 100b are coupled to a service provider network 105 that includes provider edge (PE) equipment 110a, 110b, and 100c at the edge thereof. The PE equipment 110a, 110b, and 110c provide the interface for customer edge (CE) equipment 115a, 115b, 15c, and 115d. Switches/hubs 120a, 120b, and 120c are coupled to the CE equipment 115a, 115c, and 115d as shown. The switches/hubs 120a, 120b, and 120c terminate multiple host machines 125a, 125b, 125c, 125d, 125e, 125f, and 125g. Alternatively, host machines may be coupled directly to the CE equipment, such as host machines 125h and 125i coupled directly to CE equipment 115b. The customer may also include routing equipment, such as router 130, which is coupled to switch/hub 120a. In the network shown in FIG. 1, the machines and devices coupled to CE equipment 115a and 115b may be part of one virtual private network (VPN) and the machines and devices coupled to CE equipment 115c and 115d may be part of another VPN. Moreover, the customer may obtain Internet service from either ISP 100a and 100b. To differentiate between VPN services and Internet services, for example, the PE equipment 110a, 110b, and 110c associates packet traffic with one service or the other.

Embodiments of the present invention will be described hereafter in the context of PE equipment classifying packets as being associated with one service or another based on layer two (data link layer) and/or layer three (network layer) communication protocol information obtained for the packets. Embodiments of the present invention are discussed herein in the context of classifying packets as being associated with either VPN service or Internet service. It will be understood that these two services are merely examples of services that may be provided to a customer through a single physical link. The present invention is not limited to these two services but is applicable to any service that may be implicitly classified based on information, such as layer two and/or layer three communication protocol information, associated with the packets.

Figure 2:
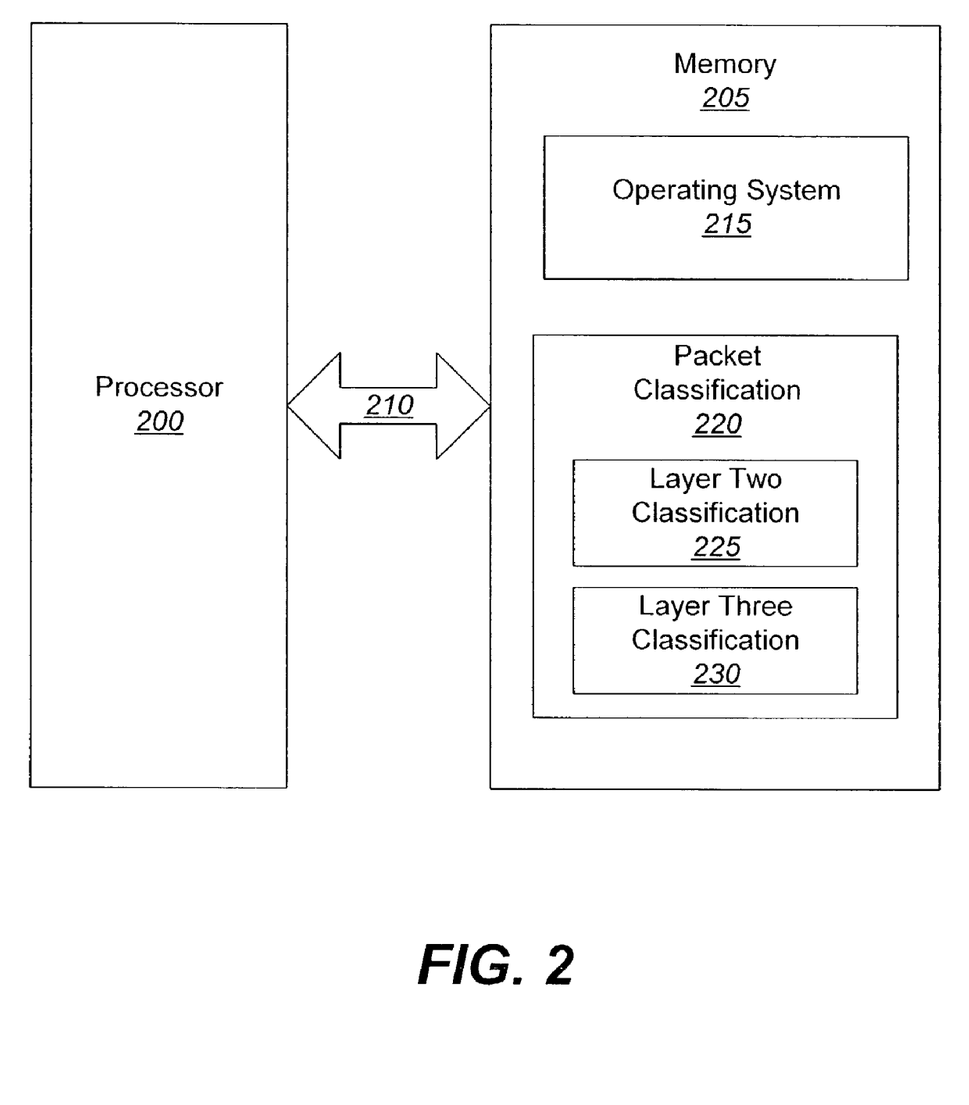
FIG. 2 is a block diagram that illustrates a software architecture for use in provider edge (PE) equipment in accordance with some embodiments of the present invention.

FIG. 2 illustrates a processor 200 and memory 205 that may be used in embodiments of PE equipment, e.g., PE equipment 110a, 110b, and 110c of FIG. 1, in accordance with the present invention. The processor 200 communicates with the memory 205 via an address/data bus 210. The processor 200 may be, for example, a commercially available or custom microprocessor. The memory 205 is representative of the one or more memory devices containing the software and data used to facilitate packet classification and/or association with services in accordance with embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to two or more categories of software and/or data: an operating system 215 and a packet classification module 220. The operating system 215 generally controls the operation of the PE equipment. In particular, the operating system 215 may manage the PE equipment's software and/or hardware resources and may coordinate execution of programs by the processor 200. The packet classification module 220 comprises a layer two classification module 225 and a layer three classification module 230. The layer two classification module 225 and the layer three classification module 230 may be configured to classify packets as being associated with one service or another based on layer two (data link layer) and/or layer three (network layer) communication protocol information obtained for the packets, respectively, as will be discussed in detail hereafter.

Although FIG. 2 illustrates an exemplary PE equipment software architecture in accordance with some embodiments of the present invention, it will be understood that the present invention is not limited to such a configuration but is intended to encompass any configuration capable of carrying out operations described herein.

Computer program code for carrying out operations of PE equipment discussed above with respect to FIG. 2 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, and computer program products in accordance with exemplary embodiments of the invention. These flowchart and/or block diagrams further illustrate exemplary operations of classifying packets as being associated with one service or another based on communication protocol information obtained for the packets, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
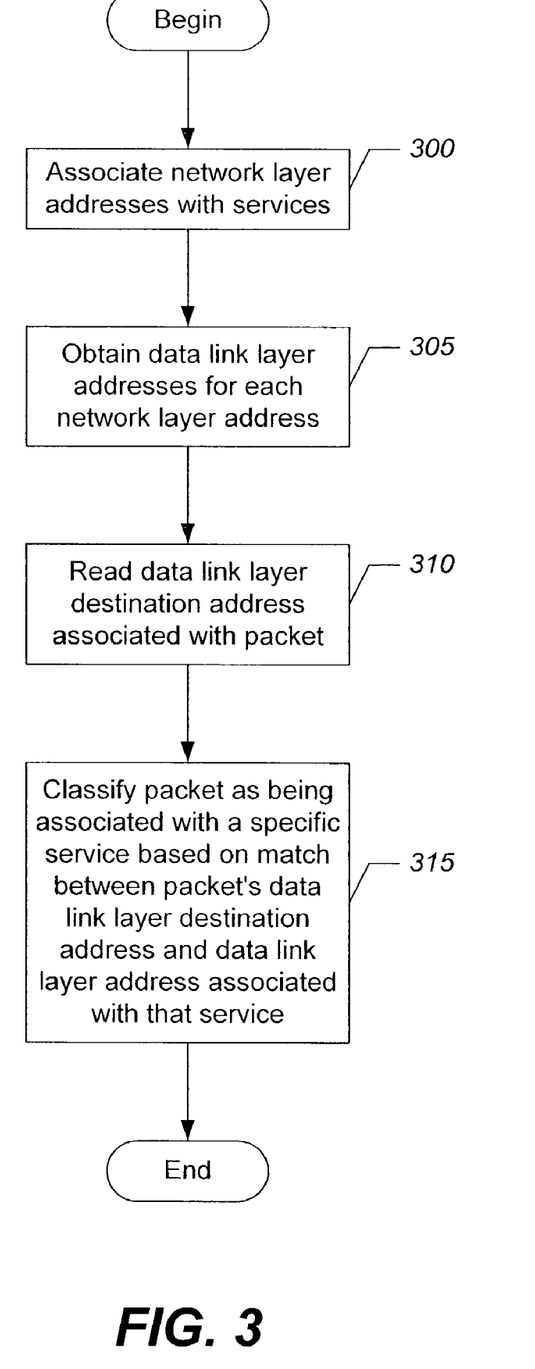
FIGS. 3-6 are flowcharts that illustrate operations for classifying packets as being associated with one service or another based on communication protocol information obtained for the packets in accordance with some embodiments of the present invention.

Referring now to FIG. 3, exemplary operations for classifying packets as being associated with one service or another based on layer two communication protocol information obtained for the packets will now be described. Operations begin at block 300 where PE equipment, such as PE equipment 110a, 110b, and 110c of FIG. 1, associates network layer addresses with particular services. For example, the Internet Protocol (IP) for gateway machines may be associated with an Internet access service. IP addresses for machines comprising a virtual private network (VPN) may be associated with a VPN service. In some embodiments, the PE equipment may detect a routing protocol executing on an Internet router that broadcasts the network layer address of the Internet router and associate the network layer address of the Internet router with the Internet Access service. Alternatively, the PE equipment may snoop a Dynamic Host Configuration Protocol (DHCP) packet that contains the network address of the Internet router. The network layer address obtained from the DHCP packet may be associated with the Internet access service. The PE equipment may then obtain respective data link layer addresses at block 305 for the network layer addresses identified at block 300.

Figure 4:
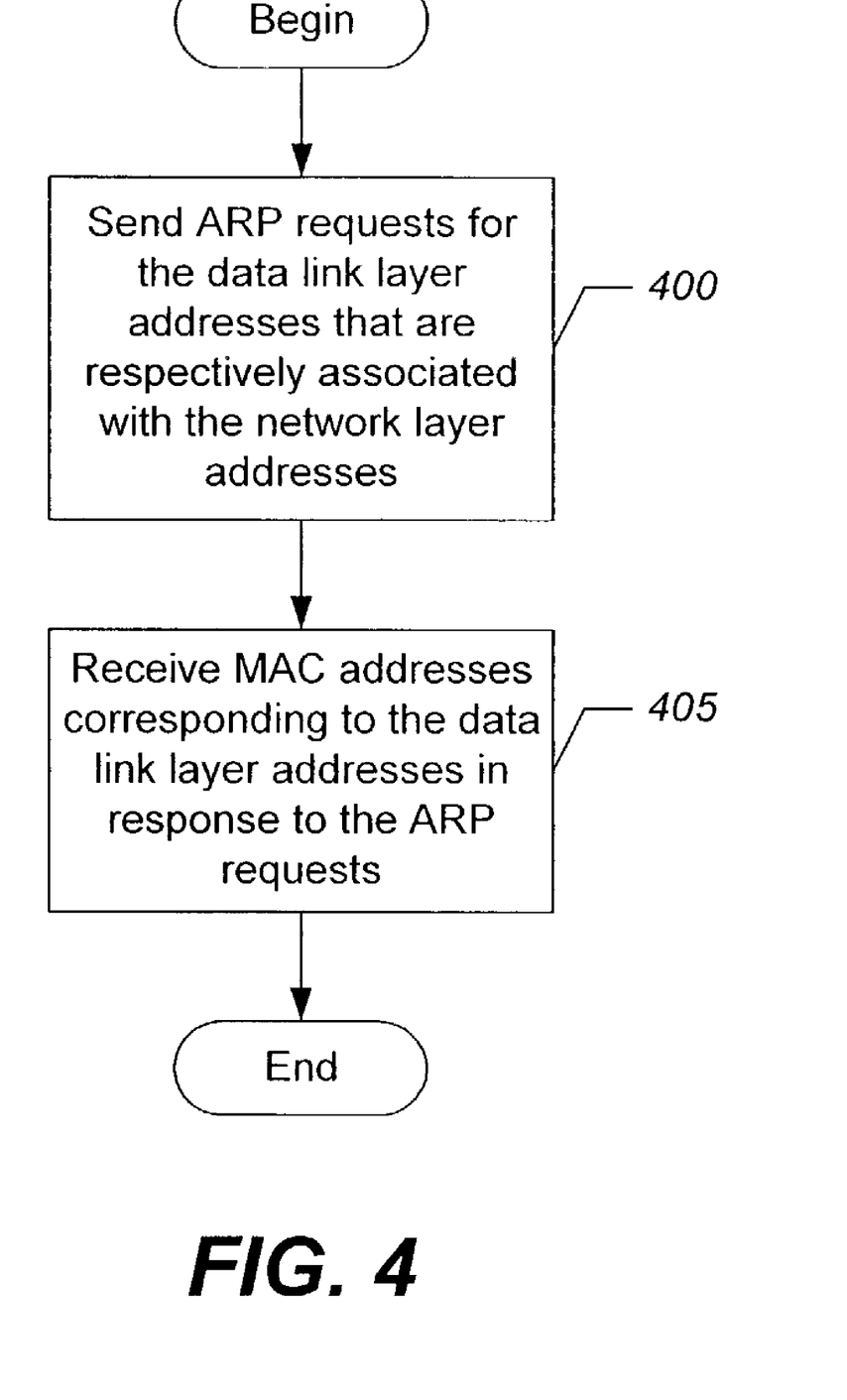

In accordance with some embodiments of the present invention illustrated in FIG. 4, the data link layer addresses may be obtained by sending Address Resolution Protocol (ARP) requests for the data link layer addresses that are respectively associated with the network layer addresses at block 400. ARP is a protocol used by the IP network layer protocol to map IP network addresses to the hardware addresses used by the data link protocol. ARP requests are broadcast using, for example, an Ethernet broadcast address. The target systems recognize their respective network layer addresses and respond with their respective data link layer addresses. Thus, at block 405, the PE equipment receives data link layer addresses, such as Medium Access Control (MAC) addresses, in response to the ARP requests.

Returning now to FIG. 3, at block 310, the PE equipment reads the data link layer destination address associated with a packet. The packet is then classified at block 315 as being associated with a specific service based on a match between the packet's data link layer destination address and the data link layer address associated with that service indirectly through the network layer address. Advantageously, a service provider may identify packet traffic as being associated with a particular service implicitly based only on layer two communication protocol information carried by the packet. Thus, a service provider may differentiate between traffic associated with different services even if a customer has relatively unsophisticated networking equipment that is incapable of marking and/or tagging packets with a particular service identifier.

Figure 5:
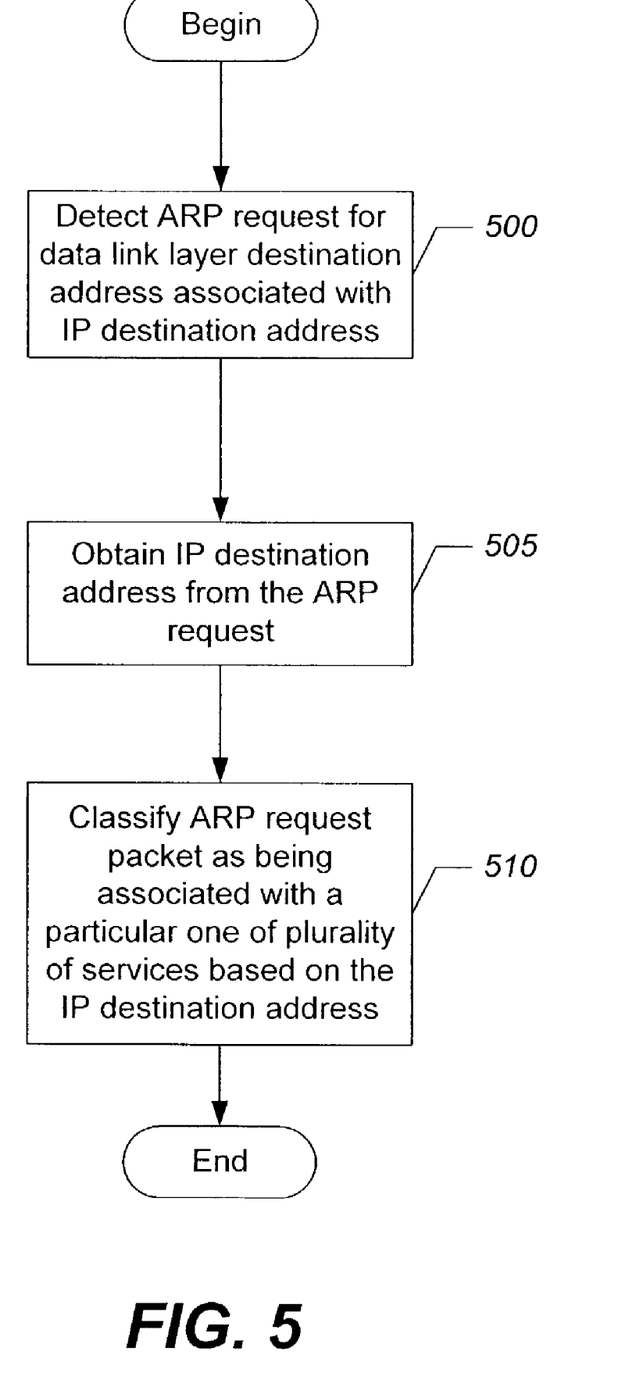

ARP packets may also be classified as being associated with a particular service in accordance with some embodiments of the present invention. Referring now to FIG. 5, an ARP request packet for obtaining a data link layer destination address that is associated with an IP destination address is detected at block 500. The ARP request packet includes a destination protocol field allowing the PE equipment to obtain the destination protocol address therefrom at block 505. At block 510, the PE equipment classifies the ARP request packet as being associated with a particular one of a plurality of services based on the destination protocol address obtained from the ARP request packet.

Figure 6:
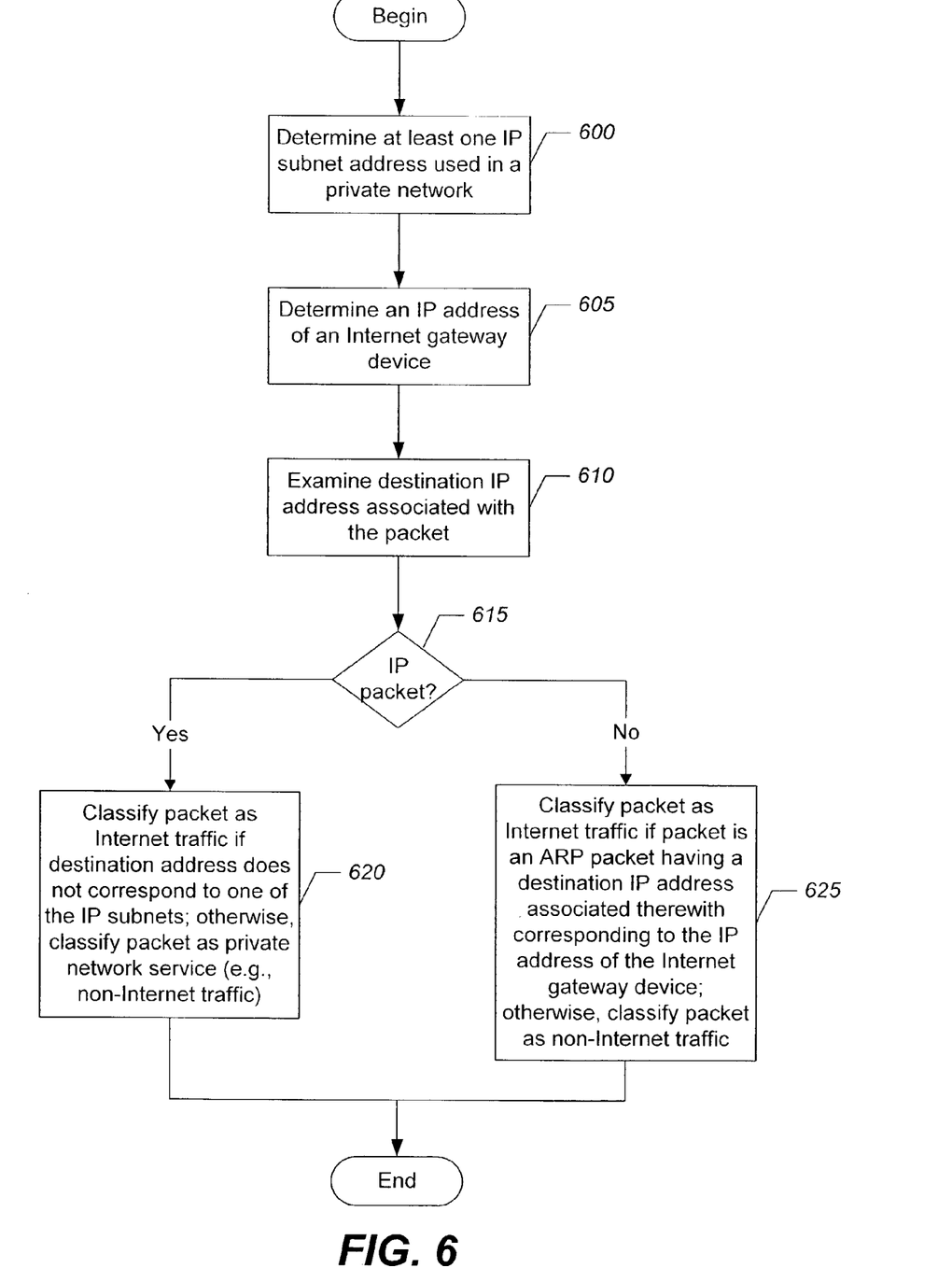

In accordance with other embodiments of the present invention, packets may be classified as being associated with one service or another based on layer three communication protocol information obtained for the packets. Exemplary operations for classifying packets as being associated with a service based on layer three communication protocol information will now be described with reference to FIG. 6. Operations begin at block 600 where the PE equipment determines one or more IP subnet addresses used in a private network. At block 605, the PE equipment determines an IP address of an Internet gateway device. When processing a packet, the PE equipment examines the destination IP address associated with the packet at block 610. If the packet is an IP packet as determined at block 615, then, at block 620, if the destination is one of the subnets for the private network, then the packet is classified in the private network service. If the packet is an IP packet with a destination address that is not in one of the private network subnets, then the packet is classified as Internet traffic. If, however, the packet is an ARP packet for the ISP gateway, then the packet is classified as Internet traffic at block 625. Otherwise, the packet is classified as non-Internet traffic. Thus, in accordance with some embodiments of the present invention, Internet traffic may be directed to the Internet service and other traffic may be directed to the private network service.

The flowcharts of FIGS. 3-6 illustrate the architecture, functionality, and operations of embodiments of the PE equipment 110a, 110b, and 110c software. In this regard, each block represents a module, segment, or portion of code, which comprises one or more executable instructions for implementing the specified logical function(s). It should also be noted that in other implementations, the function(s) noted in the blocks may occur out of the order noted in FIGS. 3-6. For example, two blocks shown in succession may, in fact, be executed substantially concurrently or the blocks may sometimes be executed in the reverse order, depending on the functionality involved.

Advantageously, the packet classification methodologies discussed above with respect to FIGS. 3-6 may be used to allow service providers to differentiate between traffic associated with various services without the need to require their customers to upgrade their networking equipment to more sophisticated and potentially more costly equipment that may mark or tag packets with unique service identifiers.

Many variations and modifications can be made to the preferred embodiments without substantially departing from the principles of the present invention. All such variations and modifications are intended to be included herein within the scope of the present invention, as set forth in the following claims.

We claim:

1. A method of classifying a packet, comprising:
   detecting a routing protocol executing on an Internet router;
   associating a network layer address of the Internet router with an Internet access service;
   obtaining a data link layer address that is associated with the network layer address, the data link layer address being associated with the service; and
   classifying the packet as being associated with the service if a data link layer destination address associated with the packet matches the data link layer address.

2. The method of claim 1, wherein the network layer address is an Internet Protocol (IP) address.

3. The method of claim 1, wherein the data link layer address and the data link layer destination address are Medium Access Control (MAC) addresses.

4. The method of claim 3, wherein obtaining the data link layer address that is associated with the network layer address, comprises:
   sending an Address Resolution Protocol (ARP) request for the data link layer address that is associated with the network layer address; and
   receiving a Medium Access Control (MAC) address corresponding to the data link layer address, responsive to the ARP request.

5. A method of classifying a packet, comprising:
   snooping a Dynamic Host Configuration Protocol (DHCP) packet containing a network layer address of an Internet router;
   associating a network layer address of the Internet router with an Internet access service;
   obtaining a data link layer address that is associated with the network layer address, the data link layer address being associated with the service; and
   classifying the packet as being associated with the service if a data link layer destination address associated with the packet matches the data link layer address.

6. A method of classifying a packet, comprising:
   determining at least one Internet Protocol (IP) subnet address used in a private network;
   determining an IP address of an Internet gateway device;
   examining a destination IP address associated with the packet; and
   classifying the packet as Internet traffic if the destination IP address corresponds to an address other than the at least one IP subnet address used in the private network, otherwise, classifying the packet as non-Internet traffic if the packet is an IP packet.

7. The method of claim 6, further comprising:
   classifying the packet as Internet traffic if the packet is an Address Resolution Protocol (ARP) packet having a destination Internet Protocol (IP) address associated therewith that corresponds to the IP address of the Internet gateway device.

8. A system for classifying a packet, comprising:
   means for detecting a routing protocol executing on an Internet router;
   means for associating a network layer address of the Internet router with an Internet access service;
   means for obtaining a data link layer address that is associated with the network layer address, the data link layer address being associated with the service; and
   means for classifying the packet as being associated with the service if a data link layer destination address associated with the packet matches the data link layer address.

9. The system of claim 8, wherein the network layer address is an Internet Protocol (IP) address.

10. The system of claim 8, wherein the data link layer address and the data link layer destination address are Medium Access Control (MAC) addresses.

11. The system of claim 10, wherein the means for obtaining the data link layer address that is associated with the network layer address, comprises:
    means for sending an Address Resolution Protocol (ARP) request for the data link layer address that is associated with the network layer address; and
    means for receiving a Medium Access Control (MAC) address corresponding to the data link layer address, responsive to the ARP request.

12. A system for classifying a packet, comprising:
    means for snooping a Dynamic Host Configuration Protocol (DHCP) packet containing a network layer address of an Internet router;
    means for associating a network layer address of the Internet router with an Internet access service;
    means for obtaining a data link layer address that is associated with the network layer address, the data link layer address being associated with the service; and
    means for classifying the packet as being associated with the service if a data link layer destination address associated with the packet matches the data link layer address.

13. A system for classifying a packet, comprising:
    means for determining at least one Internet Protocol (IP) subnet address used in a private network;
    means for determining an IP address of an Internet gateway device;

means for examining a destination IP address associated with the packet; and means for classifying the packet as Internet traffic if the destination IP address corresponds to an address other than the at least one IP subnet address used in the private network, otherwise, classifying the packet as non-Internet traffic if the packet is an IP packet.

14. The system of claim 13, further comprising:

means for classifying the packet as Internet traffic if the packet is an Address Resolution Protocol (ARP) packet having a destination Internet Protocol (IP) address associated therewith that corresponds to the IP address of the Internet gateway device.

15. A computer program product for classifying a packet, comprising:

a computer readable storage medium having computer readable program code embodied therein, the computer readable program code comprising:

computer readable program code configured to detect a routing protocol executing on an Internet router;

computer readable program code configured to associate a network layer address of the Internet router with a an Internet access service;

computer readable program code configured to obtain a data link layer address that is associated with the network layer address, the data link layer address being associated with the service; and computer readable program code configured to classify the packet as being associated with the service if a data link layer destination address associated with the packet matches the data link layer address.

16. The computer program product of claim 15, wherein the network layer address is an Internet Protocol (IP) address.

17. The computer program product of claim 15, wherein the data link layer address and the data link layer destination address are Medium Access Control (MAC) addresses.

18. The computer program product of claim 17, wherein the computer readable program code configured to obtain the data link layer address that is associated with the network layer address, comprises:

computer readable program code configured to send an Address Resolution Protocol (ARP) request for the data link layer address that is associated with the network layer address; and computer readable program code configured to receive a Medium Access Control (MAC) address corresponding to the data link layer address, responsive to the ARP request.

19. A computer program product for classifying a packet, comprising:

computer readable program code configured to snoop a Dynamic Host Configuration Protocol (DHCP) packet containing a network layer address of an Internet router;

computer readable program code configured to associate a network layer address of the Internet router with an Internet access service;

computer readable program code configured to obtain a data link layer address that is associated with the network layer address, the data link layer address being associated with the service; and computer readable program code configured to classify the packet as being associated with the service if a data link layer destination address associated with the packet matches the data link layer address.

20. A computer program product for classifying a packet, comprising:

a computer readable storage medium having computer readable program code embodied therein, the computer readable program code comprising:

computer readable program code configured to determine at least one Internet Protocol (IP) subnet address used in a private network;

computer readable program code configured to determine an IP address of an Internet gateway device;

computer readable program code configured to examine a destination IP address associated with the packet; and computer readable program code configured to classify the packet as Internet traffic if the destination IP address corresponds to an address other than the at least one IP subnet address used in the private network, otherwise, configured to classifying the packet as non-Internet traffic if the packet is an IP packet.

21. The computer program product of claim 20, further comprising:

computer readable program code configured to classify the packet as Internet traffic if the packet is an Address Resolution Protocol (ARP) packet having a destination Internet Protocol (IP) address associated therewith that corresponds to the IP address of the Internet gateway device.

* * * * *

UNITED STATES PATENT AND TRADEMARK OFFICE
CERTIFICATE OF CORRECTION

PATENT NO. : 7,447,215 B2  Page 1 of 1
APPLICATION NO. : 10/308486
DATED : November 4, 2008
INVENTOR(S) : Lynch et al.

It is certified that error appears in the above-identified patent and that said Letters Patent is hereby corrected as shown below:

Column 9, Claim 15, Line 24: Please correct "with a an"
To read -- with an --

Signed and Sealed this

Sixteenth Day of December, 2008

JON W. DUDAS
*Director of the United States Patent and Trademark Office*